United States Patent
Meng et al.

(10) Patent No.: US 12,488,580 B2
(45) Date of Patent: Dec. 2, 2025

(54) METHOD AND SYSTEM FOR IDENTIFYING OBJECTS

(71) Applicant: Siemens Aktiengesellschaft, Munich (DE)

(72) Inventors: Fan Bo Meng, Beijing (CN); Xiang Li, Beijing (CN); Xiao Feng Wang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 261 days.

(21) Appl. No.: 18/044,443

(22) PCT Filed: Sep. 11, 2020

(86) PCT No.: PCT/CN2020/114844
§ 371 (c)(1),
(2) Date: Mar. 8, 2023

(87) PCT Pub. No.: WO2022/052052
PCT Pub. Date: Mar. 17, 2022

(65) Prior Publication Data
US 2023/0360380 A1 Nov. 9, 2023

(51) Int. Cl.
*G06V 10/82* (2022.01)
*G06V 10/75* (2022.01)
*G06V 10/774* (2022.01)

(52) U.S. Cl.
CPC .............. *G06V 10/82* (2022.01); *G06V 10/76* (2022.01); *G06V 10/774* (2022.01); *G06V 2201/07* (2022.01); *G06V 2201/12* (2022.01)

(58) Field of Classification Search
CPC ...... G06V 10/82; G06V 10/76; G06V 10/774; G06V 2201/12; G06V 2201/07
See application file for complete search history.

(56) References Cited

U.S. PATENT DOCUMENTS

2016/0042249 A1  2/2016  Babenko et al. ............. 382/170
2020/0043464 A1  2/2020  Chae

FOREIGN PATENT DOCUMENTS

CN   102298709 A   12/2011
CN   104715254 A    6/2015
(Continued)

OTHER PUBLICATIONS

Search Report for International Application No. PCT/CN2020/114844, 12 pages.
(Continued)

*Primary Examiner* — David F Dunphy
(74) *Attorney, Agent, or Firm* — Slayden Grubert Beard PLLC

(57) ABSTRACT

The present disclosure provides methods and/or systems for identifying an object. An example method includes: generating a plurality of synthesized images according to a three-dimensional digital model, the plurality of synthesized images having different view angles; respectively extracting eigenvectors of the plurality of synthesized images; generating a first fused vector by fusing the eigenvectors of the plurality of synthesized images; inputting the first fused vector into a classifier to train the classifier; acquiring a plurality of pictures of the object, the plurality of pictures respectively having same view angles as at least a portion of the plurality of synthesized images; respectively extracting eigenvectors of the plurality of pictures; generating a second fused vector by fusing the eigenvectors of the plurality of pictures; and inputting the second fused vector into the trained classifier to obtain a classification result of the object.

14 Claims, 7 Drawing Sheets

(56) References Cited

FOREIGN PATENT DOCUMENTS

| CN | 107729818 A | 2/2018 | |
|---|---|---|---|
| CN | 109 446 985 | 3/2019 | ............... G06K 9/00 |
| CN | 110 070 626 | 7/2019 | ............. G06T 19/20 |
| CN | 110 176 064 | 8/2019 | ............. G06T 17/00 |
| CN | 111 179 440 | 5/2020 | ............. G06T 19/20 |
| GB | 2 402 311 A * | 1/2004 | ............. G06T 17/00 |
| WO | 2017 156043 | 9/2017 | ............. G06F 17/30 |

OTHER PUBLICATIONS

Su, Hang et al., "Multi-View Convolutional Neural Networks for 3D Shape Recognition," 2015 IEEE International Conference on Computer Vision, pp. 945-953.

Yin, Junjie et al., "Recognition of 3D Shapes Based on 3V-DepthPano CNN," Mathematical Problems in Engineering, vol. 2020, pp. 1-11.

Extended European Search Report, Application No. 20952840.5, 10 pages.

Chinese Office Action, Application No. 202080103768.5, 10 pages.

* cited by examiner

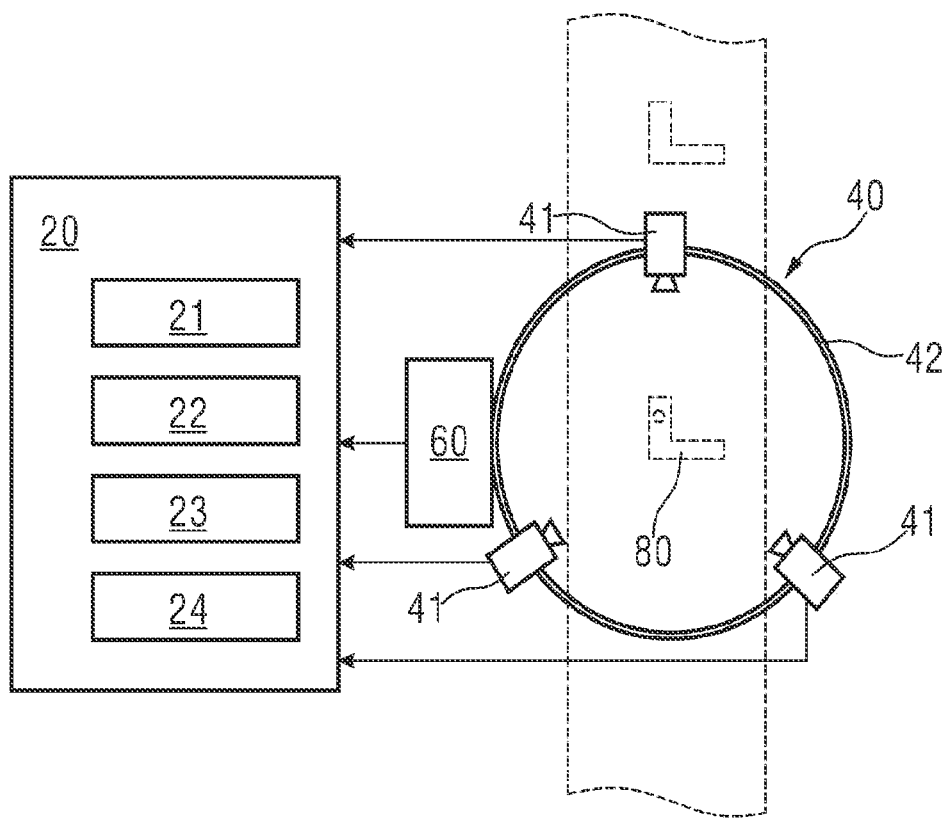

METHOD AND SYSTEM FOR IDENTIFYING OBJECTS

CROSS-REFERENCE TO RELATED APPLICATIONS

This application is a U.S. National Stage Application of International Application No. PCT/CN2020/114844 filed Sep. 11, 2020, which designates the United States of America, the contents of which are hereby incorporated by reference in their entirety.

TECHNICAL FIELD

The present disclosure relates to the technical field of computer vision.

BACKGROUND

Object identification pertains to the technical field of computer vision, and is mainly intended to identify objects in images. At present, mainstream methods for identifying objects are those based on 2D real image training and prediction, or those use three-dimensional digital model as an auxiliary recognition method. However, the conventional methods for identifying objects based on the three-dimensional model data fail to satisfy the requirements on workpiece classification in factories, in terms of accuracy.

SUMMARY

Some embodiments of the teachings of the present disclosure include methods and/or systems for identifying an object with a high identification accuracy. For example, some embodiments include a method for identifying the object comprising: generating a plurality of synthesized images according to a three-dimensional digital model, the plurality of synthesized images having different view angles; respectively extracting eigenvectors of the plurality of synthesized images; generating a first fused vector by fusing the eigenvectors of the plurality of synthesized images; inputting the first fused vector into a classifier to train the classifier; acquiring a plurality of pictures of the object, the plurality of pictures respectively having same view angles as at least a portion of the plurality of synthesized images; respectively extracting eigenvectors of the plurality of pictures; generating a second fused vector by fusing the eigenvectors of the plurality of pictures; and inputting the second fused vector into the trained classifier to obtain a classification result of the object. A plurality of synthesized images have different view angles, and correspondingly, a plurality of pictures also have different view angles. In this way, more characteristics may be embodied. The plurality of pictures respectively have the same view angles as at least a portion of the plurality of synthesized images, such that the interference caused by different angles is reduced. The method may thus achieve a high identification accuracy.

In some embodiments, camera parameters for acquiring the plurality of pictures are determined according to the view angles of the plurality of synthesized images, or software parameters for generating the plurality of synthesized images are determined according to the plurality of pictures, such that the plurality of pictures respectively have same view angles as at least a portion of the plurality of synthesized images.

In some embodiments, in the case that the plurality of pictures respectively have the same view angles as all the plurality of synthesized images, the first fused vector is generated by fusing the extracted eigenvectors of the plurality of synthesized images having the same view angles as the plurality of pictures, and the second fused vector is generated by fusing the extracted eigenvectors of the plurality of pictures.

In some embodiments, in the case that the plurality of pictures respectively have the same view angles as the at least a portion of the plurality of synthesized images, the second fused vector is generated by fusing the extracted eigenvectors of the plurality of pictures in combination with auxiliary vectors, wherein a total quantity of the eigenvectors of the plurality of pictures and the auxiliary vectors is equal to a quantity of the synthesized images; and the first fused vector is generated by fusing the extracted eigenvectors of the plurality of synthesized images having the same view angles as the plurality of pictures in combination with the auxiliary vectors, wherein a total quantity of the eigenvectors of the plurality of synthesized images having the same view angles as the plurality of pictures and the auxiliary vectors is equal to the quantity of the synthesized images; or in the case that the plurality of pictures respectively have the same view angles as the at least a portion of the plurality of synthesized images, the first fused vector is generated by fusing the extracted eigenvectors of the plurality of synthesized images having the same view angles as the plurality of pictures, and the second fused vector is generated by fusing the extracted eigenvectors of the plurality of pictures.

In some embodiments, the plurality of synthesized images are generated by CAD software according to the three-dimensional digital model.

In some embodiments, the eigenvectors of the plurality of synthesized vectors and the eigenvectors of the plurality of pictures are respectively extracted by CNN. The classifier includes a classifier based on deep learning.

In some embodiments, a scheme of the fusion is determined based on an AutoML technology or a neural architecture search technology.

In some embodiments, the plurality of synthesized images are domain-randomized, and the eigenvectors of the plurality of synthesized images are respectively extracted; and the plurality of synthesized pictures are domain-randomized, and the eigenvectors of the plurality of pictures are respectively extracted As another example, some embodiments include a system for identifying the object with a processor and a photographing mechanism. The processor includes an image generating module, a characteristic extracting module, a fusing module, and a classifier module. The image generating module is configured to generate a plurality of synthesized images according to a three-dimensional digital model. The plurality of synthesized images have different view angles. The characteristic extracting module is configured to respectively extract eigenvectors of the plurality of synthesized image. The fusing module is configured to generate a first fused vector by fusing the eigenvectors of the plurality of synthesized images. The classifier module is configured to be trained according to the first fused vector input. The photographing mechanism is configured to acquire a plurality of pictures. The processor is configured to control the photographing mechanism or the image generating module such that the plurality of pictures respectively have same view angles as at least a portion of the plurality of synthesized images. The characteristic extracting module is further configured to respectively extract eigenvectors of the plurality of pictures. The fusing module is further configured to generate a second fused vector by fusing the eigenvectors of the plurality of pictures. The trained classifier module is configured to obtain a classification result of the object according to the second fused vector input. A plurality of synthesized images have different view angles, and correspondingly, a plurality of pictures also have different view angles. In this way, more characteristics may be embodied. The processor is capable of controlling the photographing mechanism or the image generating module such that the plurality of pictures respectively have same view angles as at least a portion of the plurality of synthesized images. In this way, interference caused due to different angles is reduced. The system may, therefore, achieve a high identification accuracy.

In some embodiments, the photographing mechanism includes a camera and a stand. The camera is movably connected to the stand. The system further includes a driving mechanism, configured to drive the camera to move relative to the stand. The processor is further configured to output a set of control signals according to the view angles of the plurality of synthesized images. The driving mechanism is further configured to control movements of the camera according to the control signals to acquire the plurality of pictures respectively having the same view angles as the at least a portion of the plurality of synthesized images.

In some embodiments, the photographing mechanism includes a plurality of cameras. The system further includes a position sensing unit. The position sensing unit is configured to detect spatial positions and photographing angles of the plurality of cameras and generate a set of view angle signals according to the spatial positions and the photographing angles of the plurality of cameras. The processor is further configured to determine parameters for generating the plurality of synthesized images according to the view angle signals, such that the plurality of pictures respectively have the same view angles as the at least a portion of the plurality of pictures.

In some embodiments, in the case that the plurality of pictures respectively have the same view angles as all the plurality of synthesized images, the fusing module is further configured to generate the first fused vector by fusing the extracted eigenvectors of the plurality of synthesized images having the same view angles as the plurality of pictures, and generate the second fused vector by fusing the extracted eigenvectors of the plurality of pictures.

In some embodiments, in the case that the plurality of pictures respectively have the same view angles as the at least a portion of the plurality of synthesized images, the fusing module is further configured to generate the second fused vector by fusing the extracted eigenvectors of the plurality of pictures in combination with auxiliary vectors, wherein a total quantity of the eigenvectors of the plurality of pictures and the auxiliary vectors is equal to a quantity of the synthesized images; and generate the first fused vector by fusing the extracted eigenvectors of the plurality of synthesized images having the same view angles as the plurality of pictures in combination with the auxiliary vectors, wherein a total quantity of the eigenvectors of the plurality of synthesized images having the same view angles as the plurality of pictures and the auxiliary vectors is equal to the quantity of the synthesized images; or in the case that the plurality of pictures respectively have the same view angles as the at least a portion of the plurality of synthesized images, the fusing module is further configured to generate the first fused vector by fusing the extracted eigenvectors of the plurality of synthesized images having the same view angles as the plurality of pictures, and the second fused vector is generated by fusing the extracted eigenvectors of the plurality of pictures.

In some embodiments, the image generating module is further configured to generate the plurality of synthesized images by CAD software according to the three-dimensional digital model.

In some embodiments, the characteristic extracting module is further configured to respectively extract the eigenvectors of the plurality of synthesized vectors and the eigenvectors of the plurality of pictures by CNN. The classifier module includes a classifier module based on deep learning.

In some embodiments, the fusing module is further configured to determine a scheme of the fusion based on an AutoML technology or a neural architecture search technology.

In some embodiments, the characteristic extracting module is further configured to domain-randomize the plurality of synthesized images, and respectively extract the eigenvectors of the plurality of synthesized images. The characteristic extracting module is further configured to domain-randomize the plurality of pictures, and respectively extract the eigenvectors of the plurality of pictures.

As another example, some embodiments include a computer-readable storage medium which store the code for use by the system and can identify the object accurately. The system executes one or more of the methods described herein when the code is executed by the processor.

BRIEF DESCRIPTION OF THE DRAWINGS

The accompanying drawings are merely for schematic and illustrative description and demonstration of the present disclosure, instead of limiting the scope of the present disclosure.

FIG. 7 is a schematic structural diagram of a system for identifying an object incorporating teachings of the present disclosure.

REFERENCE NUMERALS AND DENOTATIONS THEREOF

Figure 1:
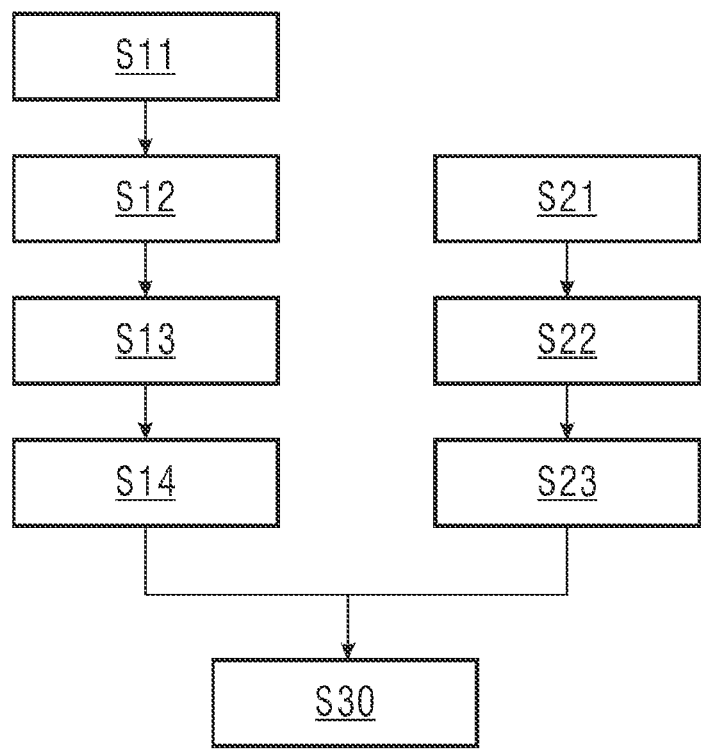
FIG. 1 is a flowchart of an example method for identifying an object incorporating teachings of the present disclosure.

20—Processor
21—Image generating module
22—Character extracting module
23—Fusing module
24—Classifier module
40—Photographing mechanism
41—Camera
42—Stand
50—Driving mechanism 60—Position sensing unit
80—Object
M—Three-dimensional digital model
S1, S2, S3—Synthesized images
Sv1, Sv2, Sv3—Eigenvectors of the synthesized images
Fv1—First fused vector
P1, P2, P3—Pictures
Pv1, Pv2, Pv3—Eigenvectors of the pictures
Fv2—Second fused vector
CNN1, CNN2, CNN3—Convolutional neural networks
R—Classification result

DETAILED DESCRIPTION

For clearer descriptions of the technical features, objectives, and the technical effects of various applications of the teachings of the present disclosure, specific embodiments are hereinafter described with reference to the accompanying drawings. In the drawings, like reference numerals denote elements having the same structure or having the similar structure but the same function. In this text, the term "exemplary" is used herein to mean "serving as an example, instance, or illustration", and any illustration or embodiment described herein as "exemplary" shall not be necessarily construed as preferred or advantageous over other illustrations or embodiment.

In this text, the terms "first", "second", and the like do not represent degrees of importance or a sequence, but only for differentiation, and for ease of description. For brevity, parts relevant to the teachings of the present disclosure are merely illustrated in the drawings, and these parts do not denote the actual structure of the product.

FIG. 1 is a flowchart of an example method for identifying an object incorporating teachings of the present disclosure. As illustrated in FIG. 1, the method according to this embodiment includes the following steps, wherein the sequence of the steps is not limited to the following:

S11: A plurality of synthesized images are generated according to a three-dimensional digital model. The plurality of synthesized images have different view angles, and may have a plurality of view angles that represent more characteristics. In this text, the term "plurality of" is interpreted as "at least two".

In some embodiments, the plurality of synthesized images are generated by computer aided design (CAD) software according to the three-dimensional digital model. The CAD software may be, for example, AutoCAD developed by Autodesk. In other embodiments, other software capable of generating the synthesized images according to the three-dimensional digital model may also be used, for example, Unigraphicx NX (UG) developed by Siemens PLM Software.

Figure 2:
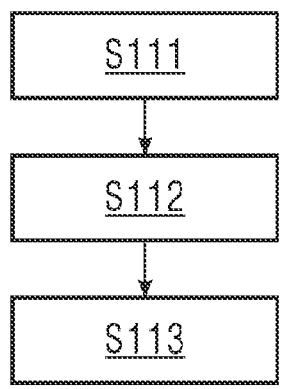
FIG. 2 is a flowchart of step S11 in the method for identifying the object as illustrated in FIG. 1.

Specifically, taking the CAD software as an example, as illustrated in FIG. 2, step S11, for example, includes the following sub-steps that are performed in sequence in the CAD software:

S111: The three-dimensional digital model is rendered.
S112: A plurality of virtual cameras are added and camera parameters of these virtual cameras are set. The quantity of virtual cameras is consistent with the quantity of synthesized images to be generated, and the camera parameters of the virtual cameras determine the view angles of the synthesized images.
S113: Images are captured by the virtual cameras to obtain the synthesized images.
S12: Eigenvectors of the plurality of synthesized images are respectively extracted. In an exemplary embodiment, for example, the eigenvectors of the plurality of synthesized images are respectively extracted by a convolutional neural network (CNN). However, in other exemplary embodiments, the eigenvectors of the plurality of synthesized images may also be extracted in other fashions. In some embodiments, the convolutional neural network is a feed-forward neural network involving convolutional computation and having a deep structure, and one of representative algorithms of deeping learning. The convolutional neural network has capabilities of characterization learning, and is capable of performing translation invariant classification for input information according to a hierarchical structure thereof, which is thus referred to as a "translation invariant artificial neural network". The CNN facilitates extraction of eigenvectors of key characteristics, to further improve the accuracy of the method for identifying the object.

S13: A first fused vector is generated by fusing the eigenvectors of the plurality of synthesized images. In an exemplary embodiment, for example, a scheme of the fusion is determined by the automated machine learning (AutoML) technology or the neural architecture search technology, which facilitates determination of an optional scheme of the fusion. However, the determination of the scheme of the fusion is not limited herein. In some embodiments, the AutoML incorporates data pre-processing, characteristic selection, algorithm selection and the like steps in machine learning with model architecture design, model training and the likes steps in deep learning, and deploys the same in a "black box". By the "black box", a desired prediction result may be obtained as long as the data is input.

The method of "designing one neural network by using another neural network" is referred to as the neural architecture search (NAS) technology, and generally, this method designs a new neural network by using reinforcement learning or evolutionary algorithm. The NAS may automatize architecture engineering, and the NAS is capable of automatically obtaining an optimal architecture as long as a data set is provided.

S14: The first fused vector is input into a classifier to train the classifier. In an exemplary embodiment, the classifier includes a classifier based on deep learning.

S21: A plurality of pictures of the object (for example, a workpiece) are acquired by the cameras. The plurality of pictures respectively have same view angles as at least a portion of the plurality of synthesized images. That is, the quantity of pictures is less than the quantity of synthesized images. If the quantity of synthesized images is 5, the quantity of pictures may be, for example, 5 or 3. The plurality of synthesized images includes synthesized images having the same view angles as the pictures.

S22: Eigenvectors of the plurality of pictures are respectively extracted. In an exemplary embodiment, for example, the eigenvectors of the plurality of pictures are respectively extracted by a CNN.

S23: A second fused vector is generated by fusing the eigenvectors of the plurality of pictures. In an exemplary embodiment, for example, the scheme of the fusion is determined based on the AutoML technology or the neural architecture search technology. The scheme of the fusion used in this step is the same as the scheme of the fusion used in step S13.

S30: The second fused vector is input into the classifier trained in step S14, to obtain a classification result of the object. In some embodiments, the plurality of synthesized images may be generally first, and then the camera parameters (for example, the positions and the angles) for acquiring the plurality of pictures may be determined according to the view angles of the plurality of synthesized images, such that the plurality of pictures respectively have the same view angles as the at least a portion of the plurality of synthesized images. Nevertheless, the plurality of pictures of the object may be acquired first, and then the camera parameters for generating the plurality of synthesized images may be determined according to the view angles of the plurality of pictures.

In some embodiments, in the case that the plurality of pictures respectively have the same view angles as all the plurality of synthesized images (that is, the quantity of pictures is the same as the quantity of synthesized images, and the view angles thereof are in an one-to-one correspondence), in step S13, the first fused vector is generated by fusing the extracted eigenvectors of the plurality of synthesized images having the same view angles as the plurality of pictures, and in step S23, the second fused vector is generated by fusing the extracted eigenvectors of the plurality of pictures.

Nevertheless, it is likely that the plurality of pictures have the same view angles as a portion of the plurality of synthesized images. That is, the quantity of pictures is less than the quantity of synthesized images. This case occurs, for example, in the scenario where the classifier has been trained by using 5 synthesized images (for example, a front view, a rear view, a plan view, a bottom view, and a three-dimensional view), but during photographing for the object, the same quantity of pictures having the same view angles fail to be acquired due to, for example, restriction of space, and instead only a portion of pictures having the same view angles are acquired, for example, 3 pictures (for example, a front view, a rear view, and a three-dimensional view). Then, in step S23, the second fused vector is generated by fusing the extracted eigenvectors of the plurality of pictures in combination with the auxiliary vectors (vectors having a modulus of 1), wherein a total quantity of the eigenvectors of the plurality of pictures and the auxiliary vectors is equal to the quantity of the synthesized images. In step S13, the first fused vector may be generated by fusing the extracted eigenvectors of the plurality of synthesized images having the same view angles as the plurality of pictures in combination with the auxiliary vectors, wherein a total quantity of the eigenvectors of the plurality of synthesized images having the same view angles as the plurality of pictures and the auxiliary vectors is equal to the quantity of the synthesized images. For example, if the quantity of synthesized images is 5 and the quantity of pictures is 3, the quantity of auxiliary vectors desired in the above two steps is 2. In this method, the scheme of the fusion does not need to be re-determined, but the first fused vector only needs to be generated by re-fusion according to the original fusion scheme, and the classifier needs to be re-trained according to the re-generated first fused vector. In this exemplary embodiment, the auxiliary vector is, for example, a unit vector (that is, a vector with a modulus equal to 1) or a zero vector.

In some embodiments, in step S13, the first fused vector may be generated by fusing the extracted eigenvectors of the plurality of synthesized images having the same view angles as the plurality of pictures, and in step S23, the second fused vector is generated by fusing the extracted eigenvectors of the plurality of pictures. Since the quantity of vectors input during the fusion is changed, the scheme of the fusion needs to be re-determined, the first fused vector only needs to be generated by re-fusion according to the new fusion scheme, and the classifier needs to be re-trained according to the re-generated first fused vector.

A plurality of synthesized images have different view angles, and correspondingly, a plurality of pictures also have different view angles. In this way, more characteristics may be embodied. The plurality of pictures respectively have same view angles as at least a portion of the plurality of synthesized images. In this way, interference caused due to different angles is reduced. The method may, therefore, achieve a high identification accuracy.

Figure 3:
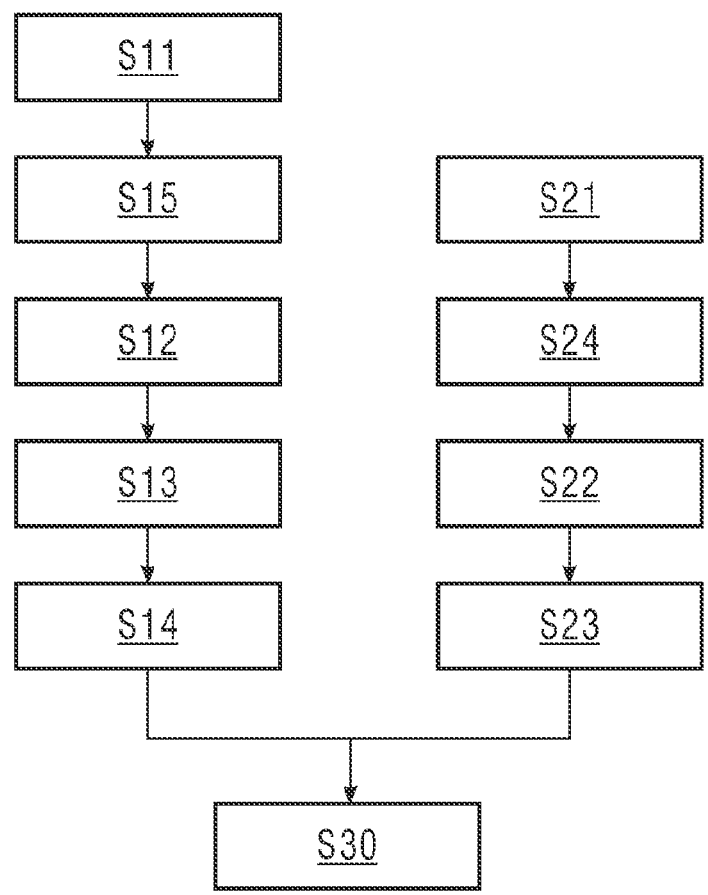
FIG. 3 is a flowchart of another example method for identifying an object incorporating teachings of the present disclosure.

FIG. 3 is a flowchart of another example method for identifying an object incorporating teachings of the present disclosure. The common points between the method for identifying the object according to this exemplary embodiment and the method for identifying the object as illustrated in FIG. 1 are not described herein any further, and the differences between these two methods are described hereinafter. In some embodiments, upon completion of step S11, step S15 is first performed to domain-randomize the plurality of synthesized images, and then step S12 is performed. Upon completion of step S21, step S24 is first performed to domain-randomize the plurality of pictures, and then step S22 is performed. By domain-randomization, known characteristics (for example, environment of the object, color of the object, and the like) that may not be used to differentiate objects may be excluded in practice. In this way, the accuracy and efficiency of the method for identifying the object are improved.

Figure 4:
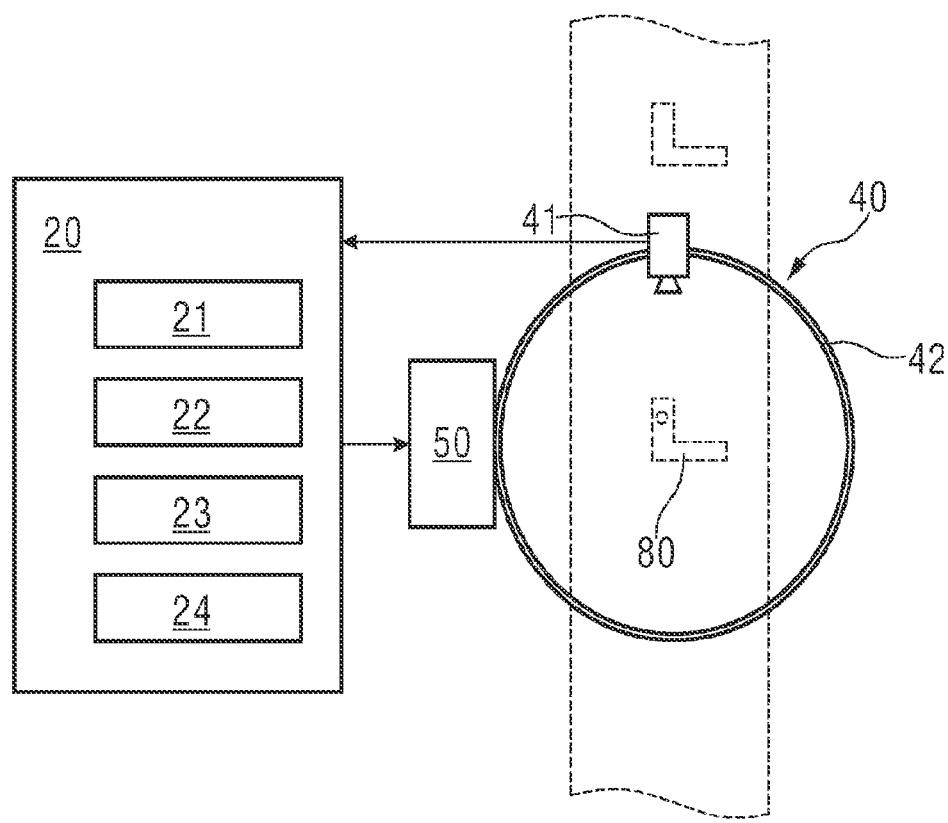
FIG. 4 is a schematic structural diagram of an example system for identifying an object incorporating teachings of the present disclosure.

FIG. 4 is a schematic structural diagram of an example system for identifying an object incorporating teachings of the present disclosure. As illustrated in FIG. 4, the system for identifying the object includes a processor 20 and a photographing mechanism 40. The processor 20 includes an image generating module 21, a characteristic extracting module 22, a fusing module 23, and a classifier module 24.

The image generating module 21 is capable of generating a plurality of synthesized images according to a three-dimensional digital model. The plurality of synthesized images have different view angles. In an exemplary embodiment, the image generating module 21 generates the plurality of synthesized images, for example, by computer aided design (CAD) software according to the three-dimensional digital model.

The characteristic extracting module 22 is configured to respectively extract eigenvectors of the plurality of synthesized image. In an exemplary embodiment, the characteristic extracting module 22, for example, respectively extracts the eigenvectors of the plurality of synthesized images by a CNN. In some embodiments, the characteristic extracting module 22 may also extract the eigenvectors of the plurality of synthesized images by using other algorithms.

The fusing module 23 is capable of generating a first fused vector by fusing the eigenvectors of the plurality of synthesized images.

In some embodiments, the fusing module 23, for example, determines a scheme of the fusion based on the AutoML technology or the neural architecture search technology, which facilitates determination of an optional scheme of the fusion. However, the determination of the scheme of the fusion is not limited herein.

The classifier module 24 is capable of being trained according to the first fused vector input. In some embodiments, the classifier module 24, for example, includes a classifier module 24 based on deep learning, which is not limited herein.

The photographing mechanism 40 is capable of acquiring a plurality of pictures of an object 80. In an exemplary embodiment, the photographing mechanism 40 includes a camera 41 and a stand 42. The camera 41 is movably connected to the stand 42. The system further includes a driving mechanism 50, capable of driving the camera 41 to move relative to the stand 42. The processor 20 is capable of outputting a set of control signals according to the view angles of the plurality of synthesized images. The driving mechanism 50 is capable of controlling movements of the camera 41 according to the control signals to acquire the plurality of pictures respectively having the same view angles as the at least a portion of the plurality of synthesized images. Accordingly, photographing positions and angles of the camera 41 may be controlled according to the view angles of the synthesized images, which saves manpower. In this case, one camera 41 needs to capture the plurality of pictures by changing positions and angles. However, in other exemplary embodiments, a plurality of cameras 41 may be deployed. In this way, the time for acquiring the pictures may be saved.

The characteristic extracting module 22 is capable of respectively extracting eigenvectors of the plurality of pictures. The fusing module 23 is capable of generating a second fused vector by fusing the eigenvectors of the plurality of pictures. The trained classifier module 24 is capable of obtaining a classification result of the object according to the second fused vector input.

In some embodiments, in the case that the plurality of pictures respectively have the same view angles as all the plurality of synthesized images (that is, the quantity of pictures is the same as the quantity of synthesized images, and the view angles thereof are in an one-to-one correspondence), the fusing module 23 is capable of generating the first fused vector by fusing the extracted eigenvectors of the plurality of synthesized images having the same view angles as the plurality of pictures, and generating the second fused vector by fusing the extracted eigenvectors of the plurality of pictures.

Nevertheless, it is likely that the plurality of pictures have the same view angles as a portion of the plurality of synthesized images. That is, the quantity of pictures is less than the quantity of synthesized images. This case occurs, for example, in the scenario where the classifier has been trained by using 5 synthesized images (for example, a front view, a rear view, a plan view, a bottom view, and a three-dimensional view), but during photographing for the object, the same quantity of pictures having the same view angles fail to be acquired since the cameras fail to be deployed due to, for example, restriction of space, and instead only a portion of pictures having the same view angles are acquired, for example, 3 pictures (for example, a front view, a rear view, and a three-dimensional view). In this case, the fusing module 23 is capable of generating the second fused vector by fusing the extracted eigenvectors of the plurality of pictures in combination with auxiliary vectors (that is, vectors having a modulus of 1), wherein a total quantity of the eigenvectors of the plurality of pictures and the auxiliary vectors is equal to a quantity of the synthesized images; and generating the first fused vector by fusing the extracted eigenvectors of the plurality of synthesized images having the same view angles as the plurality of pictures in combination with the auxiliary vectors, wherein a total quantity of the eigenvectors of the plurality of synthesized images having the same view angles as the plurality of pictures and the auxiliary vectors is equal to the quantity of the synthesized images. For example, if the quantity of synthesized images is 5 and the quantity of pictures is 3, the quantity of auxiliary vectors desired in the above two steps is 2. Accordingly, the scheme of the fusion does not need to be re-determined, but the first fused vector only needs to be generated by re-fusion according to the original fusion scheme, and the classifier needs to be re-trained according to the re-generated first fused vector.

In some embodiments, the fusion module 23, for example, is capable of generating the first fused vector by fusing the extracted eigenvectors of the plurality of synthesized images having the same view angles as the plurality of pictures, and generating the second fused vector by fusing the extracted eigenvectors of the plurality of pictures. Since the quantity of vectors input during the fusion is changed, the fusing module 23 needs to re-determine the scheme of the fusion, and generate the first fused vector only by re-fusion according to the new fusion scheme, and the classifier module 24 needs to be re-trained according to the re-generated first fused vector.

In some embodiments, the characteristic extracting module 22 is capable of domain-randomizing the plurality of synthesized images, and respectively extracting the eigenvectors of the plurality of synthesized images. The characteristic extracting module 22 is capable of domain-randomizing the plurality of pictures, and respectively extracting the eigenvectors of the plurality of pictures. By domain-randomization, known characteristics (for example, environment of the object, color of the object, and the like) that may not be used to differentiate objects may be excluded in practice. In this way, the accuracy and efficiency of the method for identifying the object are improved.

Figure 5:
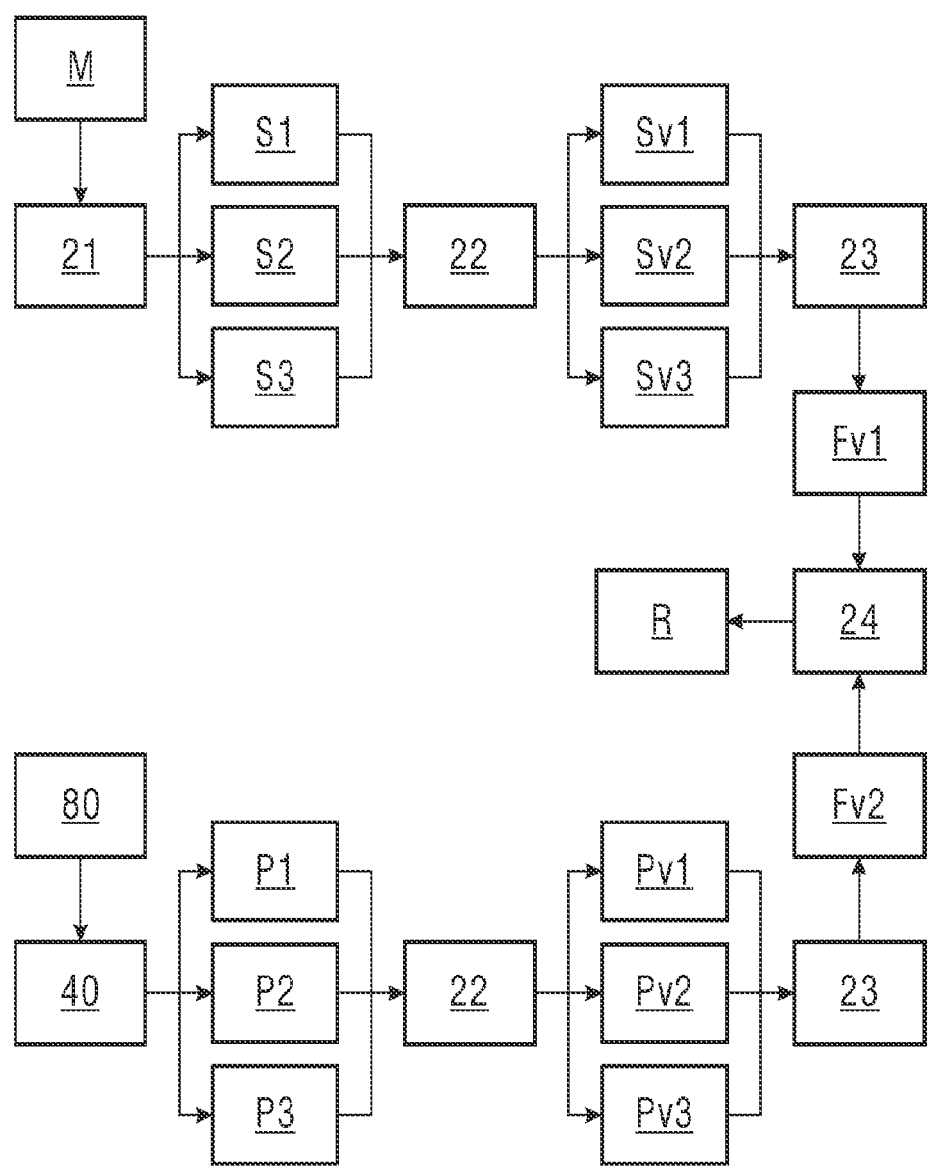
FIG. 5 schematically illustrates an operating process of the system for identifying the object as illustrated in FIG. 4.

FIG. 5 schematically illustrates an operating process of the system for identifying the object as illustrated in FIG. 4, which is not intended to limit the present disclosure. As illustrated in FIG. 5, a three-dimensional digital model M is input into the image generating module 21, the image generating module 21 is capable of generating a synthesized image S1, a synthesized image S2, and a synthesized image S3 according to the three-dimensional digital model M. The synthesized image S1, the synthesized image S2, and the synthesized image S3 are input into the characteristic extracting module 22, and the characteristic extracting module 22 extracts an eigenvector Sv1, an eigenvector Sv2, and an eigenvector Sv3. The eigenvector Sv1, the eigenvector Sv2, and the eigenvector Sv3 are input into the fusing module 23, and the fusing module 23 generates a first fused vector Fv1 by fusing the eigenvector Sv1, the eigenvector Sv2, and the eigenvector Sv3. The first fused vector Fv1 is input into the classifier module 24 for training.

As illustrated in FIG. 5, the photographing mechanism 40 acquires a picture P1, a picture P2, and a picture P3 by photographing the object 80. The picture P1 has the same view angle as the synthesized image S1, the picture P2 has the same view angle as the synthesized image S2, and the picture P3 has the same view angle as the synthesized image S3. The picture P1, the picture P2, and the picture P3 are input into the characteristic extracting module 22, and the characteristic extracting module 22 extracts an eigenvector Pv1, an eigenvector Pv2, and an eigenvector Pv3. The eigenvector Pv1, the eigenvector Pv2, and the eigenvector Pv3 are input into the fusing module 23, and the fusing module 23 generates a second fused vector Fv2 by fusing the eigenvector Pv1, the eigenvector Pv2, and the eigenvector Pv3. The second fused vector Fv2 is input into the classifier module 24 to obtain a classification result R.

Figure 6:
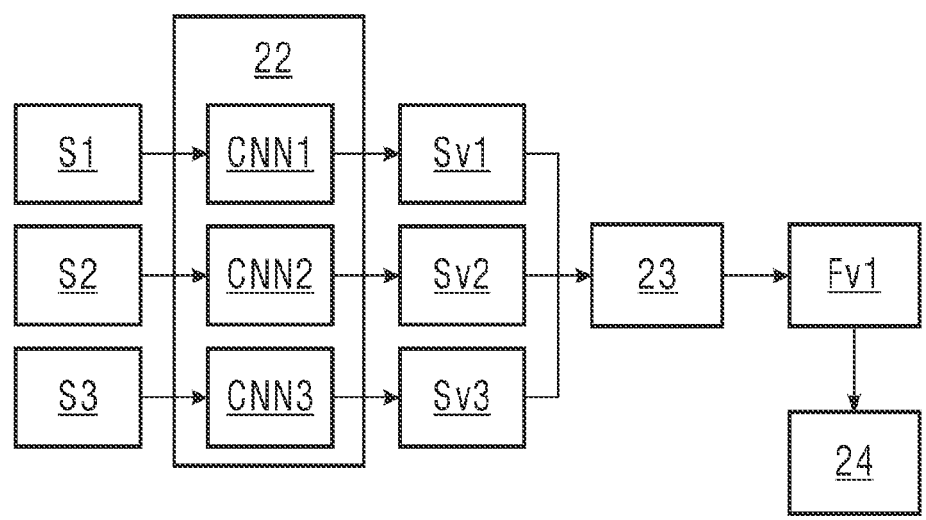
FIG. 6 illustrates an exemplary embodiment of a characteristic extracting module incorporating teachings of the present disclosure.

As illustrated in FIG. 6, in an exemplary embodiment, the characteristic extracting module 22, for example, includes a plurality of convolutional neural networks, that is, a CNN 1, a CNN 2, and a CNN 3, which are configured to respectively process different synthesized images to obtain corresponding eigenvectors. The plurality of CNNs may have the same parameter or different parameters. The fusing module 23, for example, implements the fusion by fusing the networks.

In the system for identifying the object, a plurality of synthesized images have different view angles, and correspondingly, a plurality of pictures also have different view angles. In this way, more characteristics may be embodied. The processor is capable of controlling the photographing mechanism or the image generating module such that the plurality of pictures respectively have same view angles as at least a portion of the plurality of synthesized images. In this way, interference caused due to different angles is reduced. The system, therefore, may achieve a high identification accuracy.

FIG. 7 is a schematic structural diagram of an example system for identifying an object incorporating teachings of the present disclosure. The common points between the system for identifying the object as illustrated in FIG. 7 and the system for identifying the object as illustrated in FIG. 4 are not described herein any further, and the differences between these two systems are described hereinafter. In an exemplary embodiment, the photographing mechanism 40 includes a plurality of cameras 41. The quantity of cameras is consistent with the quantity of pictures to be acquired. The system further includes a position sensing unit 60. The position sensing unit 60 is capable of detecting spatial positions and photographing angles of the plurality of cameras 41 and generating a set of view angle signals according to the spatial positions and the photographing angles of the plurality of cameras 41. The processor 20 is capable of determining determine parameters for generating the plurality of synthesized images according to the view angle signals, such that the plurality of pictures respectively have the same view angles as the at least a portion of the plurality of pictures. In this way, the parameters for generating the plurality of synthesized images may be automatically determined according to the spatial positions and the photographing angles of the cameras, which saves manpower.

It should be understood that, although this specification is described based on the embodiments, not each of the embodiments discloses an independent technical solution. Such description manner of the specification is only for clarity. A person skilled in the art should consider the specification as an entirety. The technical solutions according to the embodiments may also be suitably combined to derive other embodiments that may be understood by a person skilled in the art.

A series of detailed descriptions given in this specifically are merely intended to illustrate feasible embodiments of the present disclosure, instead of limiting the protection scope of the present disclosure. Any equivalent embodiments or modifications, for example, combinations, segmentations, or repetition of features, derived without departing from the spirit of the present disclosure shall fall within the protection scope of the present disclosure.

What is claimed is:

1. A method for identifying an object, the method comprising:
    generating a plurality of synthesized images according to a three-dimensional digital model, each synthesized image of the plurality of synthesized images having a respective view angles;
    extracting a respective eigenvector of each of the plurality of synthesized images using a convolutional neural network (CNN);
    generating a first fused vector by fusing the eigenvectors of the plurality of synthesized images using an AutoML technology-based fusion scheme or a neural architecture search technology;
    transmitting the first fused vector into a deep learning classifier to train the classifier;
    acquiring a plurality of pictures of the object, each picture of the plurality of pictures having a respective view angle matching at least a portion of the plurality of synthesized images;
    extracting respective eigenvectors for each of the plurality of pictures using the CNN;
    generating a second fused vector by fusing the eigenvectors of the plurality of pictures; and
    transmitting the second fused vector into the trained classifier to obtain a classification result of the object.

2. The method according to claim 1, further comprising:
    determining camera parameters for acquiring the plurality of pictures according to the view angles of the plurality of synthesized images, or
    determining software parameters for generating the plurality of synthesized images according to the plurality of pictures, such that the plurality of pictures respectively have same view angles as at least a portion of the plurality of synthesized images.

3. The method according to claim 1, wherein in the case that the plurality of pictures respectively have the same view angles as the at least a portion of the plurality of synthesized images, generating the first fused vector includes fusing the extracted eigenvectors of the plurality of synthesized images, and generating the second fused vector includes fusing the extracted eigenvectors of the plurality of pictures.

4. The method according to claim 1, wherein in the case that the plurality of pictures respectively have the same view angles as the at least a portion of the plurality of synthesized images, generating the second fused vector includes fusing the extracted eigenvectors of the plurality of pictures in combination with auxiliary vectors, wherein a total quantity of the eigenvectors of the plurality of pictures and the auxiliary vectors is equal to a quantity of the synthesized images; and generating the first fused vector includes fusing the extracted eigenvectors of the plurality of synthesized images having the same view angles as the plurality of pictures in combination with the auxiliary vectors, wherein a total quantity of the eigenvectors of the plurality of synthesized images having the same view angles as the plurality of pictures and the auxiliary vectors is equal to the quantity of the synthesized images; or
    in the case that the plurality of pictures respectively have the same view angles as the at least a portion of the plurality of synthesized images, generating the first fused vector includes fusing the extracted eigenvectors of the plurality of synthesized images having the same view angles as the plurality of pictures, and generating the second fused vector includes fusing the extracted eigenvectors of the plurality of pictures.

5. The method according to claim 1, wherein generating the plurality of synthesized images includes using CAD software according to the three-dimensional digital model.

6. The method according to claim 1, wherein the plurality of synthesized images are domain-randomized, and the eigenvectors of the plurality of synthesized images are respectively extracted; and the plurality of synthesized pictures are domain-randomized, and the eigenvectors of the plurality of pictures are respectively extracted.

7. A system for identifying an object, the system comprising:

a processor comprising:
- an image generating module configured to generate a plurality of synthesized images according to a three-dimensional digital model, each synthesized image in the plurality of synthesized images having a respective and different view angle;
- a characteristic extracting module configured to extract respective eigenvectors for each synthesized image of the plurality of synthesized images using a convolutional neural network (CNN);
- a fusing module configured to generate a first fused vector by fusing the eigenvectors of the plurality of synthesized images using an AutoML technology-based fusion scheme or a neural architecture search technology; and
- a deep learning classifier module configured to be trained with the first fused vector input; and
- a photographing mechanism configured to acquire a plurality of images of the object;
- wherein the processor is configured to control the photographing mechanism or the image generating module such that each of the plurality of pictures has a respective view angle matching at least a portion of the plurality of synthesized images;

the characteristic extracting module is further configured to extract respective eigenvectors of the plurality of pictures;

the fusing module is further configured to generate a second fused vector by fusing the eigenvectors of the plurality of pictures; and the trained classifier module is configured to obtain a classification result of the object according to the second fused vector input.

8. The system according to claim 7, wherein:
the photographing mechanism comprises a camera movably connected to a stand; and
the system further comprises a driving mechanism configured to drive the camera to move relative to the stand;
the processor is further configured to output a set of control signals according to the view angles of the plurality of synthesized images; and
the driving mechanism is further configured to control movements of the camera according to the control signals to acquire the plurality of pictures respectively having the same view angles as the at least a portion of the plurality of synthesized images.

9. The system according to claim 7, wherein:
the photographing mechanism comprises a plurality of cameras;
the system further comprises a position sensing unit configured to detect spatial positions and photographing angles of the plurality of cameras and generate a set of view angle signals according to the spatial positions and the photographing angles of the plurality of cameras; and the processor is further configured to determine parameters for generating the plurality of synthesized images according to the view angle signals, such that the plurality of pictures respectively have the same view angles as the at least a portion of the plurality of pictures.

10. The system according to claim 7, wherein in the case that the plurality of pictures respectively have the same view angles as the at least a portion of the plurality of synthesized images, the fusing module is further configured to generate the first fused vector by fusing the extracted eigenvectors of the plurality of synthesized images, and generate the second fused vector by fusing the extracted eigenvectors of the plurality of pictures.

11. The system according to claim 7, wherein in the case that the plurality of pictures respectively have the same view angles as the at least a portion of the plurality of synthesized images, the fusing module is further configured to generate the second fused vector by fusing the extracted eigenvectors of the plurality of pictures in combination with auxiliary vectors, wherein a total quantity of the eigenvectors of the plurality of pictures and the auxiliary vectors is equal to a quantity of the synthesized images; and generate the first fused vector by fusing the extracted eigenvectors of the plurality of synthesized images having the same view angles as the plurality of pictures in combination with the auxiliary vectors, wherein a total quantity of the eigenvectors of the plurality of synthesized images having the same view angles as the plurality of pictures and the auxiliary vectors is equal to the quantity of the synthesized images; or
- in the case that the plurality of pictures respectively have the same view angles as the at least a portion of the plurality of synthesized images, the fusing module is further configured to generate the first fused vector by fusing the extracted eigenvectors of the plurality of synthesized images having the same view angles as the plurality of pictures, and generate the second fused vector by fusing the extracted eigenvectors of the plurality of pictures.

12. The system according to claim 7, wherein the image generating module is further configured to generate the plurality of synthesized images by CAD software according to the three-dimensional digital model.

13. The system according to claim 7, wherein the characteristic extracting module is further configured to domain-randomize the plurality of synthesized images, and respectively extract the eigenvectors of the plurality of synthesized images; and domain-randomize the plurality of synthesized images, and respectively extract the eigenvectors of the plurality of pictures.

14. A non-transitory computer-readable storage medium, wherein the computer-readable storage medium stores code thereon for use by a system; the system performs the method according to claim 1 when the code is executed by a processor.

* * * * *